(12) United States Patent
Alagar et al.

(10) Patent No.: US 10,771,568 B2
(45) Date of Patent: Sep. 8, 2020

(54) SYSTEM FOR INTERCEPTING AND RECONSTRUCTING SESSION DATA FOR WEB INCIDENTS

(71) Applicant: Bank of America Corporation, Charlotte, NC (US)

(72) Inventors: Ramesh Alagar, Tamilnadu (IN); Prabakar Rangarajan, Tamilnadu (IN)

(73) Assignee: Bank of America Corporation, Charlotte, NC (US)

( * ) Notice: Subject to any disclaimer, the term of this patent is extended or adjusted under 35 U.S.C. 154(b) by 120 days.

(21) Appl. No.: 16/137,127

(22) Filed: Sep. 20, 2018

(65) Prior Publication Data

US 2020/0099754 A1    Mar. 26, 2020

(51) Int. Cl.
*H04L 12/00* (2006.01)
*H04L 29/08* (2006.01)
*H04L 29/06* (2006.01)
*G06F 16/955* (2019.01)
*G06F 16/958* (2019.01)

(52) U.S. Cl.
CPC .......... *H04L 67/146* (2013.01); *G06F 16/955* (2019.01); *G06F 16/958* (2019.01); *H04L 63/1425* (2013.01); *H04L 63/30* (2013.01)

(58) Field of Classification Search
CPC ................. H04L 67/22; H04L 67/2823; H04L 29/06027; H04L 65/403; H04L 63/0884; H04L 43/028; H04L 43/0823
USPC ............................. 709/201, 203, 219, 204
See application file for complete search history.

(56) References Cited

U.S. PATENT DOCUMENTS

| | | | |
|---|---|---|---|
| 2,013,617 A * | 9/1935 | Werfel | A47J 43/27 220/568 |
| 7,016,953 B2 | 3/2006 | Lemon | |
| 7,072,951 B2 | 7/2006 | von Klopp et al. | |
| 7,099,939 B2 | 8/2006 | von Klopp et al. | |
| 7,359,935 B1 * | 4/2008 | Karipides | H04L 67/22 709/203 |
| 7,827,608 B2 | 11/2010 | Bird et al. | |
| 8,024,785 B2 | 9/2011 | Andress et al. | |
| 8,259,588 B2 | 9/2012 | Selitser et al. | |
| 8,578,504 B2 * | 11/2013 | Brown | G06F 21/6209 726/26 |
| 8,706,486 B1 * | 4/2014 | Devarajan | G06F 21/6245 704/235 |
| 8,776,017 B2 | 7/2014 | Perlmutter et al. | |

(Continued)

OTHER PUBLICATIONS

U.S. Appl. No. 16/111,438, titled "Error Detection of Data Leakage in a Data Processing System," by Ramesh Alagar et al., filed Aug. 24, 2018.

*Primary Examiner* — Frantz Coby
(74) *Attorney, Agent, or Firm* — Michael A. Springs

(57) ABSTRACT

A system for generating user session objects is disclosed. The system intercepts web traffic data and extracts dynamic content items from the web traffic data such that the dynamic content items are separated from static content items. The system further groups the dynamic content items based on their associated user session IDs. The system then links together the dynamic content items of a group in sequence to generate a user session object, wherein the dynamic content items include one or more static content reference IDs associated with the static content items.

20 Claims, 10 Drawing Sheets

(56) References Cited

U.S. PATENT DOCUMENTS

| | | | |
|---|---|---|---|
| 8,850,596 B2* | 9/2014 | Ramakrishnan | G06F 21/52 |
| | | | 726/26 |
| 8,893,300 B2 | 11/2014 | Ramachandran et al. | |
| 8,978,092 B2 | 3/2015 | Balinsky et al. | |
| 9,179,337 B2* | 11/2015 | Zinevich | H04L 43/0823 |
| 9,189,377 B1 | 11/2015 | Arkadyev | |
| 9,219,752 B2 | 12/2015 | Balinsky et al. | |
| 9,934,542 B2 | 4/2018 | Chauhan et al. | |
| 10,271,176 B2* | 4/2019 | Bijor | H04W 4/025 |
| 10,401,250 B2* | 9/2019 | Hanss | G01M 3/00 |
| 2002/0035617 A1* | 3/2002 | Lynch | H04L 67/2823 |
| | | | 709/219 |
| 2004/0162878 A1* | 8/2004 | Lewis | H04L 29/06027 |
| | | | 709/204 |
| 2006/0224970 A1* | 10/2006 | Bodin | G06Q 10/10 |
| | | | 715/753 |
| 2008/0123822 A1* | 5/2008 | Sapp | G06Q 30/02 |
| | | | 379/68 |
| 2011/0055229 A1* | 3/2011 | Kumar | G06Q 30/02 |
| | | | 707/751 |
| 2013/0290860 A1* | 10/2013 | Lethers | G06F 19/321 |
| | | | 715/744 |
| 2013/0298254 A1* | 11/2013 | Thomas Hall | H04L 43/028 |
| | | | 726/26 |
| 2014/0095981 A1* | 4/2014 | Olawsky | G06F 40/14 |
| | | | 715/234 |
| 2015/0355045 A1* | 12/2015 | Solomon | F17D 5/02 |
| | | | 702/36 |
| 2016/0344779 A1* | 11/2016 | Jain | H04L 65/403 |
| 2018/0210802 A1* | 7/2018 | Anderson | G06F 11/34 |
| 2018/0262503 A1* | 9/2018 | Dawson | H04L 63/0884 |
| 2020/0082828 A1* | 3/2020 | Malpani | G06Q 10/063114 |

* cited by examiner

| Supplier invoices 145 | Buyer 1 | Buyer 2 | Supplier 3 |
|---|---|---|---|
| B1S1-INV01 | ✓ | ✗ | ✗ |
| B1S2-INV02 | ✓ | ✗ | ✗ |
| B1S3-INV03 | ✓ | ✓ | ✓ |
| B2S3-INV04 | ✗ | ✓ | ✓ |
| B2S4-INV05 | ✓ | ✓ | ✗ |
| B2S5-INV06 | ✗ | ✓ | ✗ |

Users 110 — 142

Data elements 146

*FIG. 2*

SYSTEM FOR INTERCEPTING AND RECONSTRUCTING SESSION DATA FOR WEB INCIDENTS

TECHNICAL FIELD

This disclosure relates generally to web incidents, and more particularly to a system for intercepting and reconstructing session data for web incidents.

BACKGROUND

In the digital era, data has become one of the most critical components of an enterprise. As the volume of data is growing exponentially and data breaches are happening more frequently than ever before, detecting and preventing data loss and leakage has become one of the most pressing security concerns for enterprises.

It is challenging for enterprises to protect data against information leakage in the era of big data. As data becomes one of the most critical components of an enterprise, managing and analyzing large amounts of data provides an enormous competitive advantage for enterprises. However, it also puts sensitive and valuable enterprise data at risk of loss or theft and poses significant security challenges to enterprises. The need to store, process, and analyze more and more data together with the high utilization of modern communication channels in enterprises results in an increase of possible data leakage vectors, including cloud file sharing, email, web pages, instant messaging, FTP (file transfer protocol), removable media/storage, database/file system vulnerability, camera, laptop theft, backup being lost or stolen, and social networks.

Data leakage detection faces the following technical challenges. (1) Scalability: the ability to process large content, e.g., megabytes to terabytes, and to be deployed in distributed environments. Scalability is the key to efficiently processing massive enterprise-scale amounts of data. A scalable solution can also reduce the data processing delay and achieve early data leakage detection. (2) Privacy preservation: the ability to preserve the confidentiality of sensitive data. (3) Accuracy: achieving low false negative/positive rates for the detection. The distributed nature of big data environments poses a challenge in accurate leakage detection. (4) Timeliness: immediately detect and respond to data leakage before they cause damage. The volume, variety, and velocity of big data bring both opportunities and challenges for nearly real-time identifying data leakage threats.

SUMMARY

A purpose of data leakage detection is to identify, monitor, and prevent unintentional or deliberate exposure of sensitive information in an enterprise environment.

Data leakage can be caused by internal and external information breaches, either intentionally (e.g., data theft by intruders or sabotage by insider attackers) or accidentally (e.g., accidental disclosure of sensitive information by employees and partners). Intentional data leakage includes many forms including phishing, cross-site scripting, and SQL injection are covered under Common Weakness Enumeration (CWE). There are many existing tools that are available for simulating and detecting intentional data leakage issues. Accidental data leakages are caused either due to data transmission/storage to unauthorized device or improper data retrieval criteria in code. There are no existing tools that are available to detect data leakages caused by improper data retrieval criteria in code. These accidental data leakage issues are referred to as programmatically introduced accidental data leak (PIADL) in the present disclosure.

Detection of the PIADL faces many technical challenges including scalability, privacy preservation, accuracy, and timeliness. The present disclosure discloses a system to address these technical challenges. Specifically, the disclosed system is configured to intercept web traffic data including HTTP requests and responses, de-duplicate the web traffic data, and cluster the de-duplicated web traffic data. De-duplicating and clustering the web traffic data reduces the amount of data that will be transmitted in and processed by the system. For example, de-duplicating the web traffic data involves removing duplicate copies of repeating data, thereby significantly reducing the amount of data to be transmitted over the network and to be processed by the disclosed system. This approach will reduce the strain on the network and alleviate any network bottlenecks. It will also reduce the amount of read and write operations on the memory space of the computers that implement the disclosed system, thereby reducing the burden on the memory space of the computers and improving the performance of the computers and the overall system. This increases the efficiency of the system to process a large volume of web traffic data, thereby increasing the scalability of the system.

Furthermore, the disclosed system is configured to apply a set of rules in a rule table to the web traffic data and determine whether the web traffic data associated with a user includes data that is not supposed to be sent to the user. The rules are applied to the web traffic data in the form of a series of steps/operations as discussed below. Specifically, in one embodiment, the disclosed system is configured to pre-store a plurality of allow tables. Each allow table includes a plurality of allowed data elements of a pre-defined data type that are associated with a plurality of users. Each user in an allow table is associated with a subset of the allowed data elements in the allow table. The system intercepts the web traffic data and de-duplicates the web traffic data to extract a plurality of data elements from the web traffic data. Each of the data elements is associated with a pre-defined data type. The system further segregates the plurality of data elements into a plurality of clusters based on the data types associated with the data elements so that each cluster corresponds to a pre-defined data type.

Then, the system determines whether there is a data leakage in each of the clusters. Specifically, the system identifies a first cluster of data elements associated with a first pre-defined data type and identifies data elements in the first cluster that are associated with a first user. The system further identifies a first allow table that is associated with the first pre-defined data type and identifies allowed data elements in the first allow table that are associated with the first user. The system then compares the identified data elements in the first cluster to the identified allowed data elements in the first allow table and determines whether the identified data elements in the first cluster comprises at least one data element that is not in the identified allowed data elements in the first allow table. In response to determining that the identified data elements in the first cluster comprises at least one data element that is not in the identified allowed data elements in the first allow table, the system determines that an error of data leakage is detected for the first user within the first pre-defined data type.

The above-discussed steps/operations including identifying the first cluster of data elements associated with the first pre-defined data type, identifying data elements associated with the first user, identifying allowed data elements associated with the first user, and comparing the identified data elements with the identified allowed data elements form a set of rules to determine whether the web traffic data associated with a user include data that is not supposed to be sent to the user. This approach facilitates preserving the confidentiality of the data.

Moreover, the disclosed system is further configured to determine whether a data leakage is a false alarm. Specifically, the disclosed system uses a supervised learning technique to classify whether a data leakage is a false alarm. If the system determines that the data leakage is a false alarm, the system will stop flagging the data leakage as an error. For example, if the data leakage specifies that sending a data element to a user is an error and the system later determines that the data leakage is a false alarm, the system will stop flagging the event of sending the data element to the user as an error of data leakage. Furthermore, the next time that the system detects that the same data element is sent to the same user, the system will not determine that this is an error of data leakage. This approach improves the accuracy of the detection of data leakage.

Last but not the least, the disclosed system is configured to stream the web traffic data in a Kafka framework. The Kafka framework has the capabilities such as high throughput and low latency. By employing the Kafka framework in the disclosed system, the disclosed approach of detecting the data leakage is a nearly real-time procedure for identifying data leakage threats.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and for further features and advantages thereof, reference is now made to the following description taken in conjunction with the accompanying drawings, in which:

FIG. 2 illustrates an exemplary embodiment of an allow table, according to the present disclosure;

DETAILED DESCRIPTION

Data Leakage Detection

Figure 1:
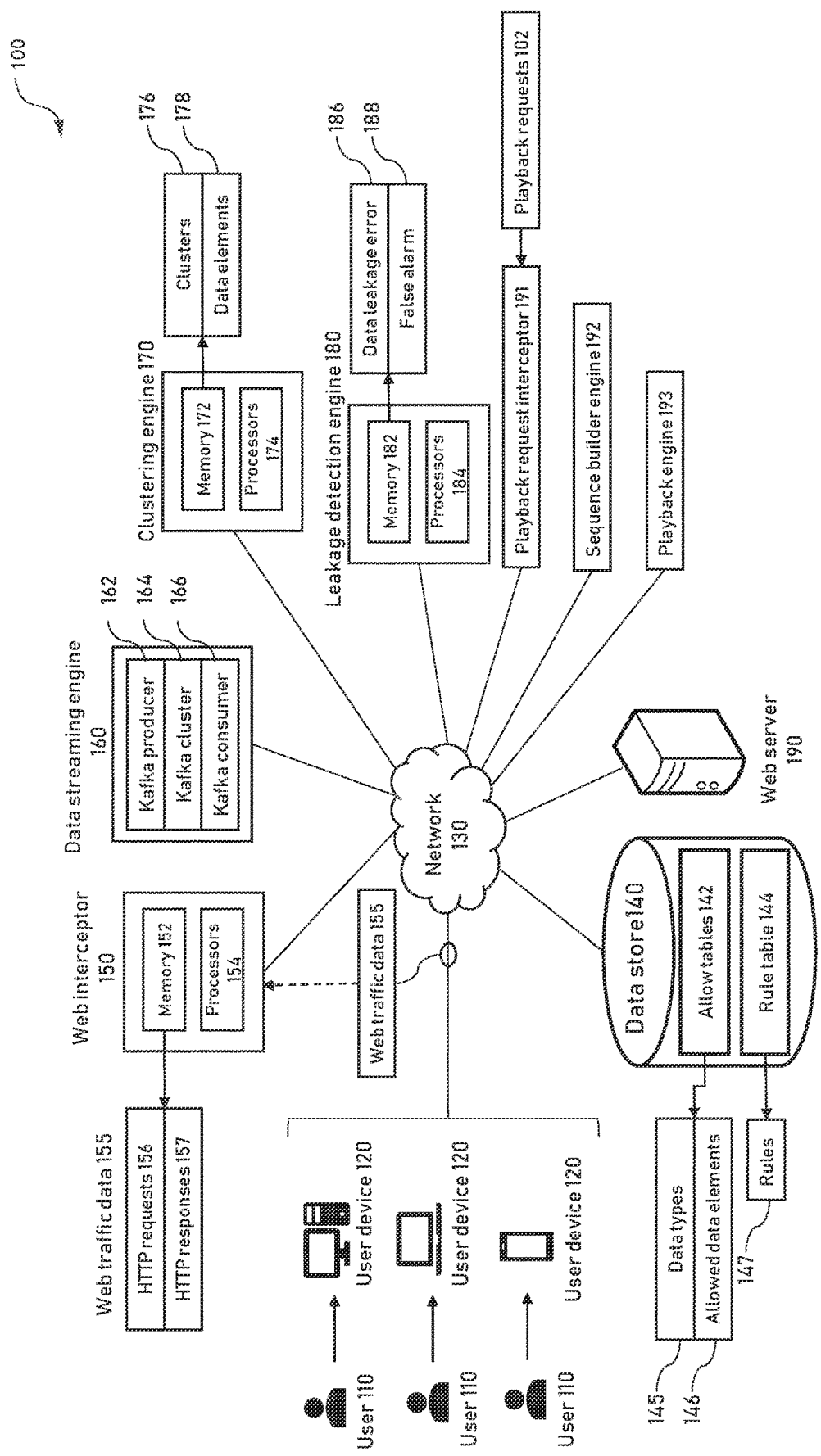
FIG. 1 illustrates an exemplary embodiment of a system for performing error detection of data leakage, according to the present disclosure.

FIG. 1 illustrates an exemplary embodiment of a system 100 for detecting data leakage, according to certain embodiments of the present disclosure. System 100 includes one or more user devices 120, a network 130, a data store 140, a web interceptor 150, a data streaming engine 160, a clustering engine 170, a leakage detection engine 180, and a web server 190.

In general, system 100 intercepts web traffic data 155 transmitted between users 110 and web server 190, de-duplicates the web traffic data 155 into data elements 178, and detects whether the data elements 178 include data that is not supposed to be sent to the users 110. This process is described in detail below.

The disclosed system 100 pre-stores a plurality of allow tables 142 in data store 140. Each allow table 142 includes a plurality of allowed data elements 146 of a pre-defined data type 145 that are associated with a plurality of users 110. Each user 110 in an allow table 142 is associated with a subset of the allowed data elements 146 in the allow table 142. Web interceptor 150 of the system 100 intercepts web traffic data 155. Web traffic data 155 includes HTTP requests 156 and HTTP responses 157 transmitted between user 110 and the web server 190. After intercepting the web traffic data 155, clustering engine 170 de-duplicates the web traffic data 155 and extracts a plurality of data elements 178. Each of the data elements 178 is associated with a pre-defined data type 145. The clustering engine 170 further groups the plurality of data elements 178 into a plurality of clusters 176 based on the data types 145 associated with the data elements 178 so that each cluster 176 corresponds to a pre-defined data type 145.

Then, the system 100 determines whether there is a data leakage error 186 in each of the clusters 176. Specifically, leakage detection engine 180 of the system 100 identifies a first cluster 176 of data elements 178 associated with a first pre-defined data type 145 and identifies data elements 178 in the first cluster 176 that are associated with a first user 110. The leakage detection engine 180 further identifies a first allow table 142 that is associated with the first pre-defined data type 145 and identifies allowed data elements 146 in the first allow table 142 that are associated with the first user 110. The leakage detection engine 180 then compares the identified data elements 178 in the first cluster 176 to the identified allowed data elements 146 in the first allow table 142 and determines whether the identified data elements 178 in the first cluster 176 comprises at least one data element 178 that is not in the identified allowed data elements 146 in the first allow table 142. In response to determining that the identified data elements 178 in the first cluster 176 comprises at least one data element 178 that is not in the identified allowed data elements 146 in the first allow table 142, the leakage detection engine 180 determines that an error of data leakage 186 is detected for the first user 110 within the first cluster 176 of data elements 178 associated with the first pre-defined data type 145.

Users 110 comprise any suitable users including businesses or other commercial organizations, government agencies, and/or individuals. Users 110 may operate on one or more user devices 120 to access system 100.

User devices 120 comprise any suitable devices or machines configured to communicate with other network devices in the system 100. Typically, user device 120 is a data processing system comprising hardware and software that communicates with the other network elements over a network, such as the Internet, an intranet, an extranet, a private network, or any other medium or link. These data processing systems typically include one or more processors, an operating system, one or more applications, and one or more utilities. Applications running on the data processing systems provide native support for web protocols including, but not limited to, support for Hypertext Transfer Protocol (HTTP), Hypertext Markup Language (HTML), and Extensible Markup Language (XML), among others. Examples of user devices 120 include, but are not limited to, desktop computers, mobile phones, tablet computers, and laptop computers.

Network 130 includes any suitable networks operable to support communication between components of system 100. Network 130 may include any type of wired or wireless communication channel capable of coupling together computing nodes. Network 130 may include any interconnecting system capable of transmitting audio, video, electrical signals, optical signals, data, messages, or any combination of the preceding. Network 130 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100. Network 130 may be configured to support any communication protocols as would be appreciated by one of ordinary skill in the art upon viewing this disclosure.

Data store 140 includes any suitable storage scheme including any software, hardware, firmware, and/or combination thereof capable of storing information. Exemplary data store 140 includes individual data storage devices (e.g., memory, disks, solid-state drives), which may be part of individual storage engines and/or may be separate entities coupled to storage engines. Data store 140 may store third-party databases, database management systems, a file system, and/or other entities that include or that manage data repositories. Data store 140 may be locally located or remotely located to other components of system 100.

As illustrated, in some embodiments, data store 140 is configured to store a plurality of allow tables 142 and a rule table 144. Each of the allow tables 142 includes a plurality of allowed data elements 146 associated with a pre-defined data type 145. Example pre-defined data types include invoices, purchase orders, and shipping documents. Therefore, a first allow table 142 may include allowed data elements 146 comprising invoices, a second allow table 142 may include allowed data elements 146 comprising purchase orders, and a third allow table 142 may include allowed data elements 146 comprising shipping documents. The allowed data elements 146 in an allow table 142 may be associated with a plurality of users 110 so that each user 110 is associated with a subset of the allowed data elements 146 in the allow table 142.

FIG. 2 illustrates an exemplary embodiment of an allow table 142, according to the present disclosure. The allow table 142 is configured with three users 110 and six data elements 146. The users 110 include "buyer 1," "buyer 2," and "supplier 3." The data elements 146 include six invoices each associated with at least one of the users 110. For example, the data element 146 "B1S1-INV01" specifies an invoice associated with the user 110 "buyer1." As another example, the data element 146 "B1S3-INV03" specifies an invoice associated with the users 110 "buyer 1" and "supplier 3." The allow table 142 is used to determine the data elements 146 that should be sent to the users 110. For example, the allow table 142 shows that the data element 146 "B1S3-INV03" can be sent to the users 110 "buyer 1" and "supplier 3," but not the user 110 "buyer 2." This is because the data element 146 "B1S3-INV03" specifies an invoice associated with the users 110 "buyer 1" and "supplier 3." The data element 146 "B1S3-INV03" may be confidential or sensitive data for the users 110 "buyer 1" and "supplier 3" and the user 110 "buyer 2" should be prevented from accessing it.

Figure 3:
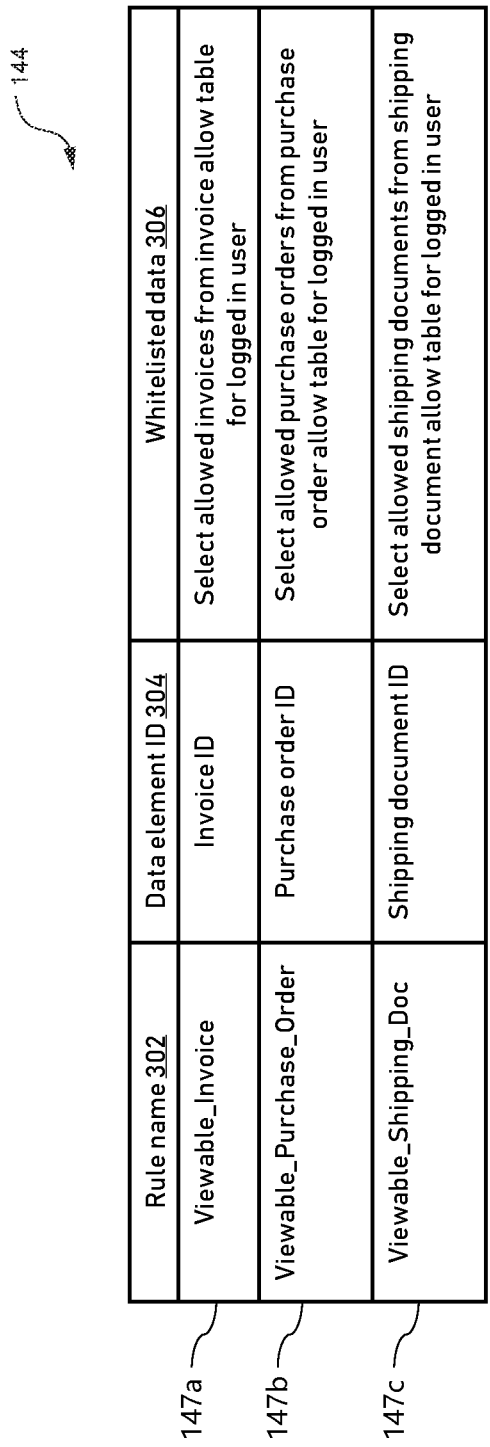
FIG. 3 illustrates an exemplary embodiment of a rule table, according to the present disclosure.

Referring back to FIG. 1, data store 140 is further configured to store a rule table 144 comprising a plurality of rules 147 that are designed to identify allowed data elements 146 of a pre-defined data type 145 for a user 110. FIG. 3 illustrates an exemplary embodiment of a rule table 144, according to the present disclosure. The rule table 144 is configured with a first column of rule names 302, a second column of data element IDs 304, and a third column of whitelisted data 306. Each of the rules 147a-c in the rule table 144 includes a rule name 302, a data element ID 304, and a whitelisted data 306. For example, the rule 147a includes a rule name 302 "viewable_invoice," a data element ID 304 "invoice ID," and a whitelisted data 306 "select allowed invoices from invoice allow table for logged in user." The rule 147a is used to identify an allow table 142 that includes invoices, identify the allowed data elements 146 in the allow table 142 that is associated with a user 110 who is logged in to the system 100, and send or display the identified allowed data elements 146 to the user 110. System 100 may apply the rules 147 in the rule table 144 to identify the allowed data elements 146 with each of the pre-defined data types 145 for each of the users 110. After identifying the allowed data elements 146 for a user 110, the system 100 can compare the identified allowed data elements 146 to the data elements 178 that are sent to the user 110 and determine whether there is a data leakage occurring. The determination of a data leakage will be discussed in greater detail below with reference to FIGS. 6-7.

Figure 4:
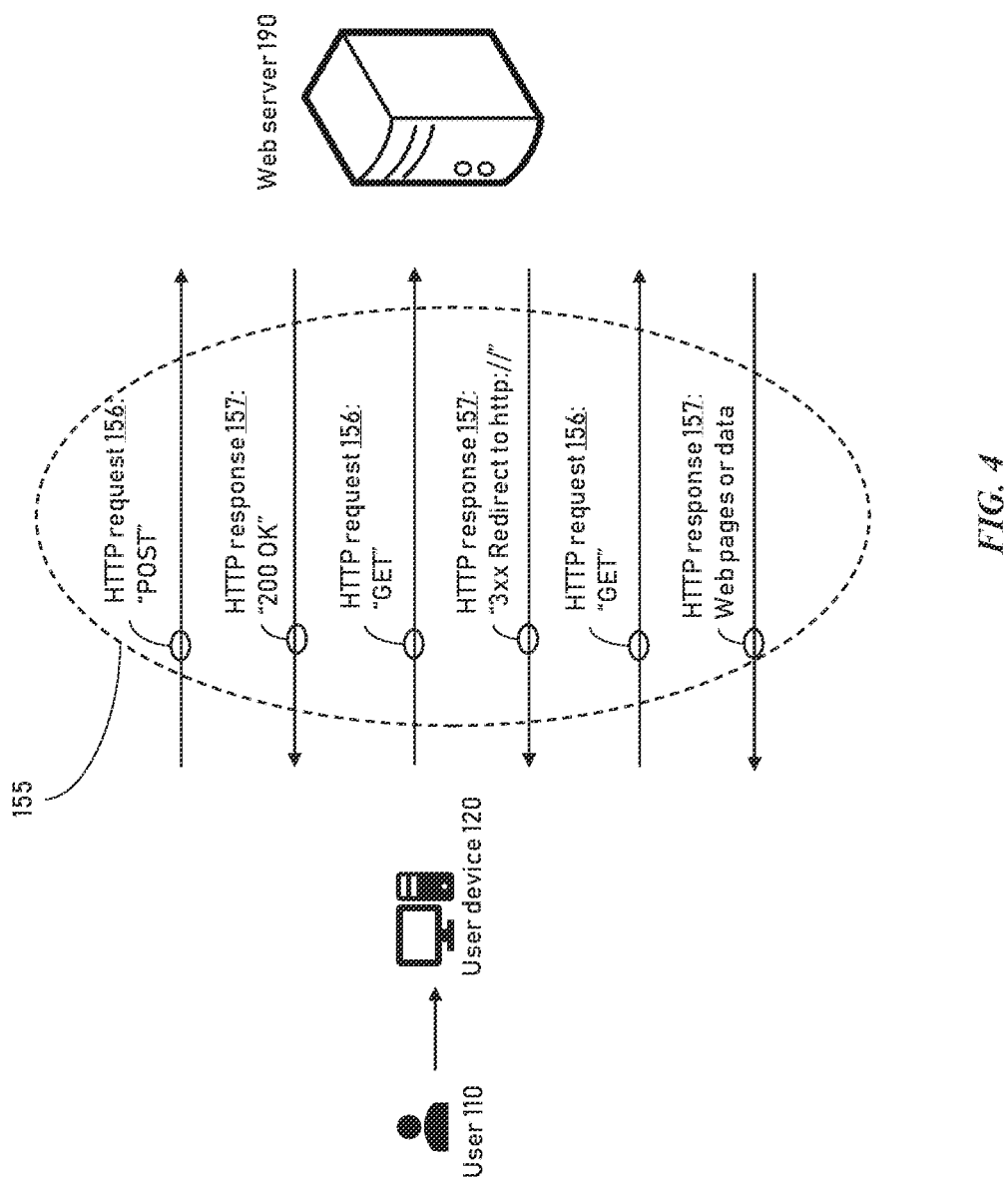
FIG. 4 illustrates an exemplary embodiment of web traffic data, according to the present disclosure.

Referring back to FIG. 1, system 100 further includes a web interceptor 150. Web interceptor 150 is a special purpose computer configured to intercept web traffic data 155 transmitted between users 110 and web server 190. Web interceptor 150 comprises one or more processors 152 and a memory 154 that implement the algorithm discussed herein. In some embodiments, the web traffic data 155 includes HTTP requests 156 and HTTP responses 157. FIG. 4 illustrates an exemplary embodiment of web traffic data 155, according to the present disclosure. As illustrated, a user 110 may operate on a user device 120 to communicate with the web server 190 of the system 100. The user 110 may use the user device 120 to send a series of HTTP requests 156 to the web server 190. In response to the HTTP requests 156, the web server 190 sends a series of HTTP responses 157 to the user device 120. Referring back to FIG. 1, the web traffic data 155 may be intercepted by the web interceptor 150 and stored in the memory 152 for further operations. For example, the web traffic data 155 including the HTTP requests 156 and the HTTP responses 157 may be processed by the clustering engine 170 to extract the data elements 178 as described below in greater detail. The web traffic data 155 may be transmitted from the web interceptor 155 to other components of system 100 within a Kafka framework. For example, system 100 includes a data streaming engine 160 that is implemented in a Kafka framework.

Data streaming engine 160 is a special purpose computer configured to stream the web traffic data 155 that are transmitted between the components of system 100, as discussed herein. As noted above, data streaming engine 160 is implemented in a Kafka framework that includes a Kafka producer 162, a Kafka cluster 164, and a Kafka consumer 166.

In general, a Kafka framework has three key capabilities: (1) it allows a user 110 or a server to publish and subscribe to a stream of records; (2) it allows a user 110 or a server to store streams of records in a fault-tolerant way; and (3) it allows a user 110 or a server to process streams of records as they occur. With these capabilities, a Kafka framework can be used for building real-time streaming data pipelines that reliably get data between systems and applications, and for building real-time streaming applications that transform or react to the stream of data. Therefore, a Kafka framework can be considered as a special purpose distributed file system dedicated to high-performance, low-latency storage, replication, and propagation. Accordingly, the data streaming engine 160 that is implemented in a Kafka framework in the present disclosure achieves a high throughput and low latency design goals. By employing the Kafka framework in the disclosed system 100, the disclosed approach of detecting the data leakage is a nearly real-time procedure for identifying data leakage threats.

Clustering engine 170 is a special purpose computer configured to cluster the web traffic data 155 as discussed herein. Clustering engine 170 comprises one or more processors 172 and a memory 174 that implement the algorithm as discussed herein. Specifically, clustering engine 170 is configured to de-duplicate the web traffic data 155. For example, the clustering engine 170 may extract the data elements 178 from the web traffic data 155 and remove the duplicate copies of the data elements 178. De-duplication improves storage utilization and it also improves the network data transfer by reducing the number of bytes that must be sent. In the de-duplication process, unique chunks of data, or byte patterns, are identified and stored during a process of analysis. As the analysis continues, other chunks are compared to the stored copy and whenever a match occurs, the redundant chunk is replaced with a small reference that points to the stored chunk. Given that the same byte pattern may occur dozens, hundreds, or even thousands of times, the amount of data that must be stored or transferred can be greatly reduced.

For example, clustering engine 170 may extract a first data element 178, for example such as an invoice, from the web traffic data 155. Clustering engine 170 may store the first data element 178 in the memory 172. Later the clustering engine 170 may extract a second data element 178 from the web traffic data 155. The clustering engine 170 may compare the second data element 178 with the first data element stored in the memory 172 and determine whether they are duplicate copies. If the clustering engine 170 determines that the second data element 178 is a duplicate copy of the first data element 178, the clustering engine 170 may remove the second data element 178. In some embodiments, the clustering engine 170 may store a reference in the memory 172 that refers to the second data element 178. Note that the reference that refers to the second data element 178 is significantly smaller in size compared to the second data element 178. Storing the reference for the second data element or completely removing the second data element 178 reduces the amount of data that must be stored in the memory 172. This facilitates reducing the burden on the memory 172 and freeing up the memory space for other operations, thereby improving the performance of the clustering engine 170 and the overall system 100. Furthermore, this approach reduces the amount of data that must be transmitted over the network 130, thereby reducing the strain on the network 130 and alleviating any network bottlenecks.

In some embodiments, the clustering engine 170 uses a k-means clustering technique to de-duplicate and cluster the web traffic data 155.

Figure 5:
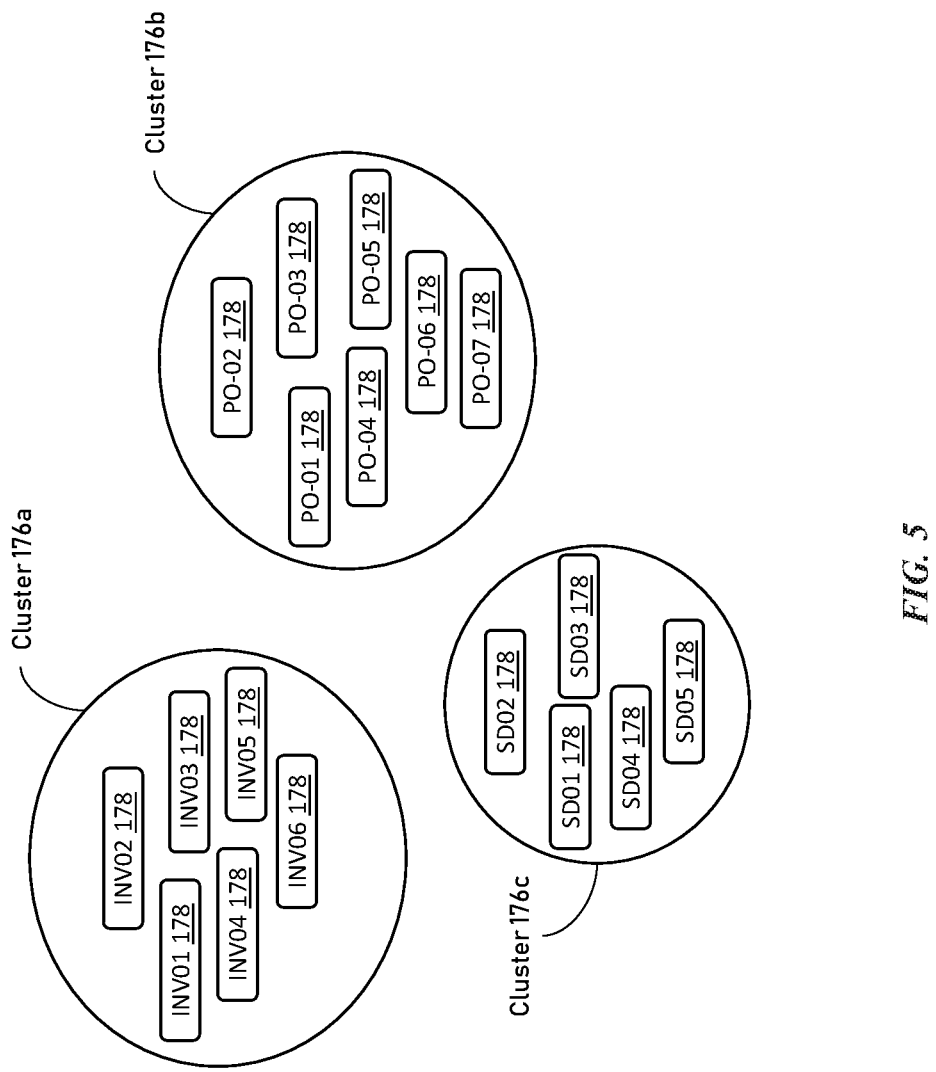
FIG. 5 illustrates an exemplary embodiment of multiple clusters of data elements, according to the present disclosure.

Clustering engine 170 is further configured to group the data elements 178 into a plurality of clusters 176. Each cluster 176 of data elements 178 is associated with a pre-defined data type 145. FIG. 5 illustrates an exemplary embodiment of multiple clusters 176a-c of data elements 178. A first cluster 176a includes a plurality of data elements 178 comprising invoices associated with the users 110. A second cluster 176b includes a plurality of data elements 178 comprising purchase orders associated with the users 110. A third cluster 176c includes a plurality of data elements 178 comprising shipping documents associated with the users 110.

Referring back to FIG. 1, leakage detection engine 180 is a special purpose computer configured to detect data leakage error 186, according to the embodiments of the present disclosure. Leakage detection engine 180 comprises one or more processors 182 and a memory 184 that implement the algorithm discussed herein. Specifically, the leakage detection engine 180 is configured to determine whether there is a data leakage error 186 in each of the clusters 176 of data elements 178 that were previously clustered by the clustering engine 170. For example, the leakage detection engine 180 may identify a first cluster 176 of data elements 178 associated with a first pre-defined data type 145 and identifies data elements 178 in the first cluster 176 that are associated with a first user 110. The leakage detection engine 180 further identifies a first allow table 142 that is associated with the first pre-defined data type 145 and identifies allowed data elements 146 in the first allow table 142 that are associated with the first user 110. The leakage detection engine 180 then compares the identified data elements 178 in the first cluster 176 to the identified allowed data elements 146 in the first allow table 142 and determines whether the identified data elements 178 in the first cluster 176 comprises at least one data element 178 that is not in the identified allowed data elements 146 in the first allow table 142. In response to determining that the identified data elements 178 in the first cluster 176 comprises at least one data element 178 that is not in the identified allowed data elements 146 in the first allow table 142, the leakage detection engine 180 determines that an error of data leakage 186 is detected for the first user 110 within the first cluster 176 of data elements 178 associated with the first pre-defined data type 145.

Figure 6:
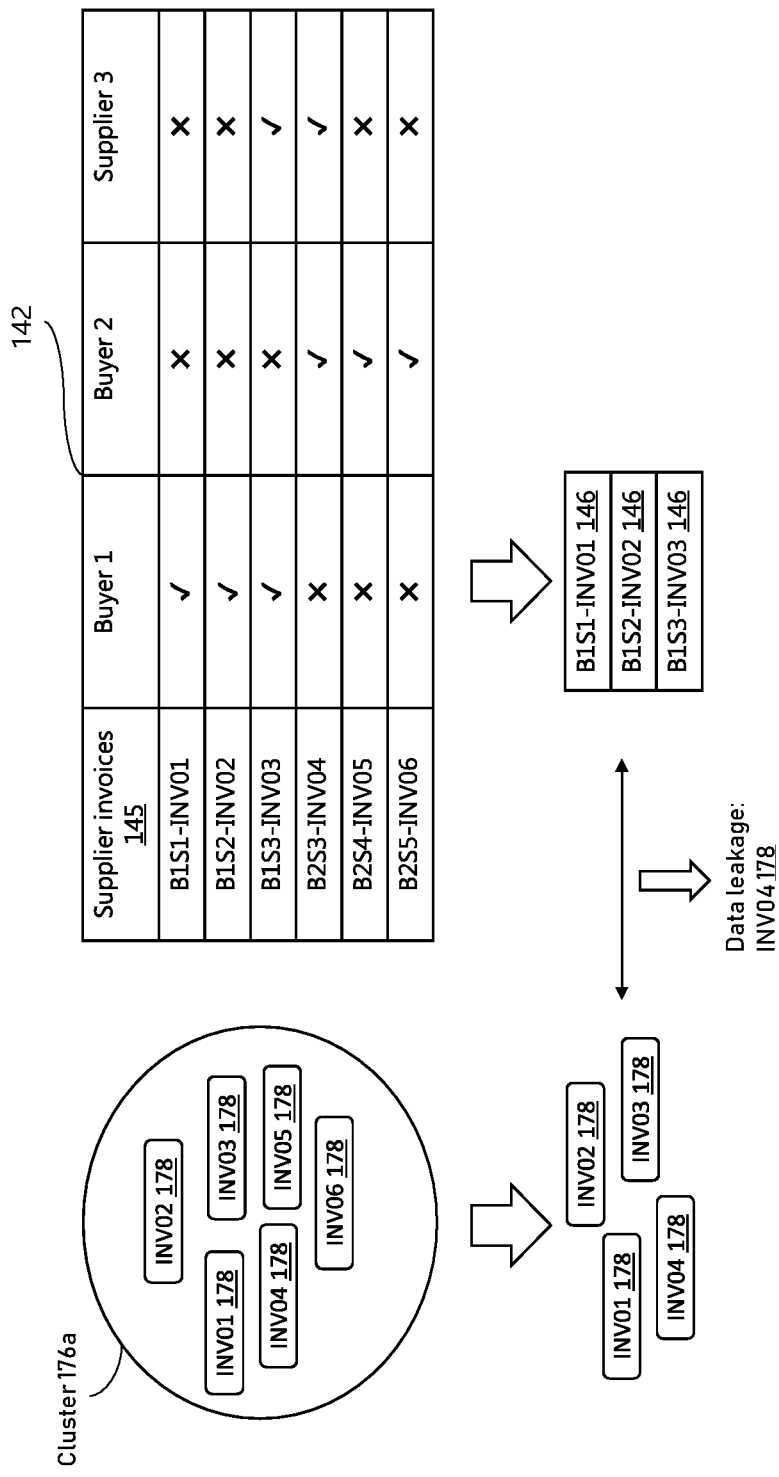
FIG. 6 illustrates an exemplary embodiment of detecting a data leakage, according to the present disclosure.

FIG. 6 illustrates an exemplary embodiment of detecting a data leakage 186, according to the present disclosure. As illustrated, the left-hand side of the figure illustrates a cluster 176a of data elements 178 including multiple invoices, such as for example, INV01-06. The leakage detection engine 180 may inspect the data elements 178 and determine that the data elements 178 including INV01-04 are associated with a first user 110, for example such as "buyer 1." These data elements 178 were previously extracted from the web traffic data 155 which means that they have been sent to the first user 110 "buyer 1." The leakage detection engine 180 then will determine whether these data elements 178 include any data that is not supposed to be sent to the first user 110. Specifically, on the right-hand side of FIG. 6, the leakage detection engine 180 identifies an allow table 142 that is associated with the data type 145 of invoice. Then, the leakage detection engine 180 identifies the allowed data elements 146 in the allow table 142 that are associated with the first user 110 "buyer 1." For example, the leakage detection engine 180 may identify the allowed data elements 146 including "B1S1-INVOL" "B1S2-INV02," and "B1S3-INV03" that are associated with the first user 110 "buyer 1." The leakage detection engine 180 then compares the identified data elements 178 including INV01-04 to the identified allowed data elements 146 including "B1S1-INVOL" "B1S2-INV02," and "B1S3-INV03." Note that here the data element "INV01" includes the same data as the allowed data element 146 "B1S1-INV01." Similarly, the data elements "INV02" and "INV03" include the same data as the allowed data elements 146 "B1S2-INV02" and "B1S3-INV03." After the comparison, the leakage detection engine 180 determines that the identified data elements 178 includes a data element 178 "INV04" that is not in the identified allowed data elements 146 for the first user 110 "buyer 1." Then, in response to determining that the identified data elements 178 comprises at least one data element 178 that is not in the identified allowed data elements 146, the leakage detection engine 180 determines that an error of data leakage 186 is detected for the first user 110 within the first cluster 176a.

The leakage detection engine 180 may continue to identify the data elements 178 in the first cluster 176a that are associated with other users 110 and determine whether there is an error of data leakage 186 for the other users 110 within the first cluster 176a. After inspecting the data elements 178 for all users 110 in the first cluster 176a, the leakage detection engine 180 may continue to examine the other clusters 176 to determine whether there is an error of data leakage 186 occurring in the other clusters 176.

The leakage detection engine 180 is further configured to determine whether a data leakage 186 is a false alarm 188. Specifically, the leakage detection engine 180 uses a supervised learning technique to classify whether a data leakage 186 is a false alarm 188. In some embodiments, the leakage detection engine 180 uses a random forest classification technique to determine whether a data leakage 186 is a false alarm 188. If the leakage detection engine 180 determines that the data leakage 186 is a false alarm 188, the leakage detection engine 180 will stop flagging the data leakage 186 as an error. For example, if the data leakage 186 specifies that sending a data element 178 to a user 110 is an error and the leakage detection engine 180 later determines that the data leakage 186 is a false alarm 188, the leakage detection engine 180 will stop flagging the event of sending the data element 178 to the user 110 as an error of data leakage 186. Furthermore, next time when the leakage detection engine 180 detects that the same data element 178 is sent to the user 110, the leakage detection engine 180 will not determine that this is an error of data leakage 186. This approach improves the accuracy of the detection of data leakage error 186.

Referring back to FIG. 1, system 100 further includes a web server 190 that is configured to communicate web traffic data 155 with user devices 120 over the network 130. The web server 190 is generally configured as a server to store, process, and store web data to users 110. Specifically, web server 190 is configured to receive HTTP requests 156 from the user devices 120 and send HTTP responses 157 to the user devices 120.

Figure 7:
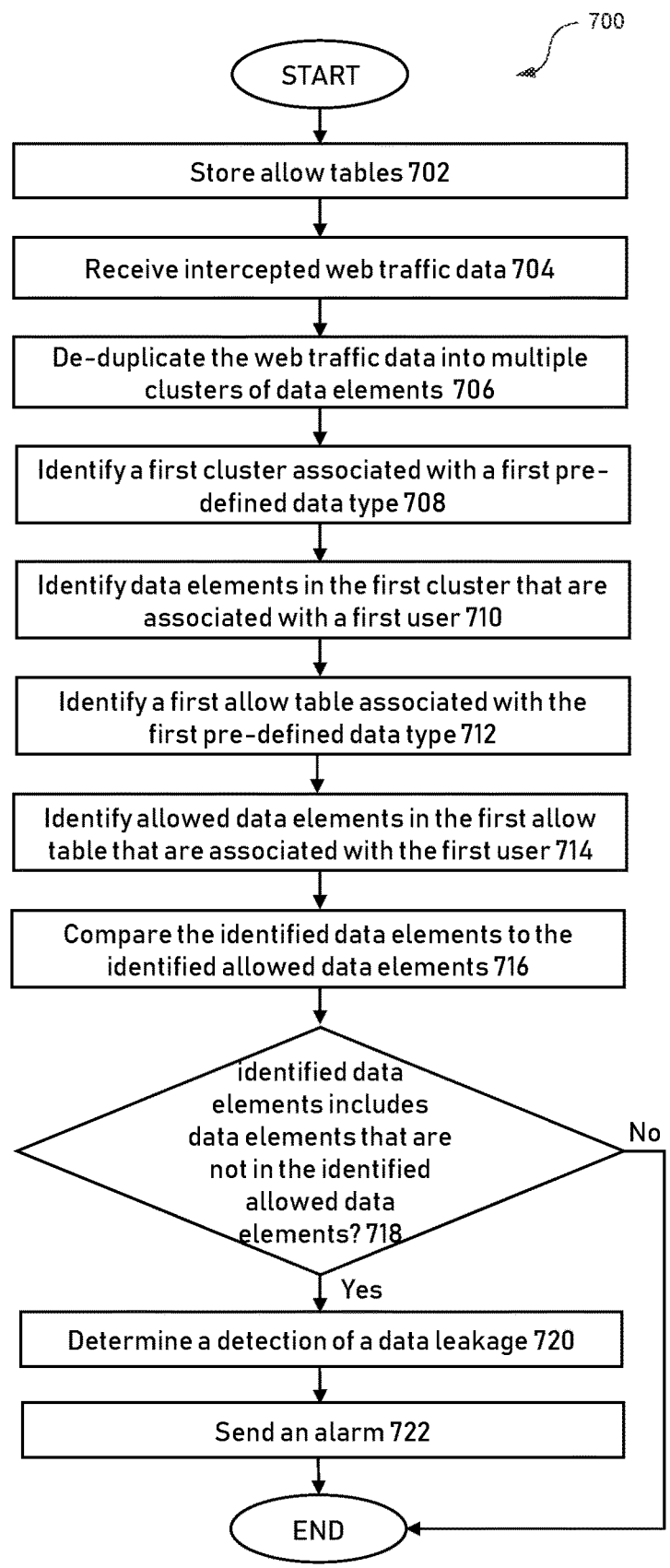
FIG. 7 illustrates a flow chart presenting an exemplary embodiment of a method of performing error detection of data leakage, according to the present disclosure.

FIG. 7 illustrates a flow chart presenting an exemplary embodiment of a method 700 of performing error detection of data leakage 186, according to the present disclosure. The following is a non-limiting example that illustrates how system 100 implements method 700.

Upon starting the process, system 100 pre-stores allow tables 142 at step 702. Each of the allow tables 142 includes a plurality of allowed data elements 146 associated with a pre-defined data type 145. Example pre-defined data types include invoices, purchase orders, and shipping documents. The allowed data elements 146 in an allow table 142 may be associated with a plurality of users 110 so that each user 110 is associated with a subset of the allowed data elements 146 in the allow table 142.

At step 704, system 100 receives intercepted web traffic data 155. The web traffic data 155 includes HTTP requests 156 and HTTP responses 157 that are communicated between users 110 and the web server 190 of the system 100. For example, the user 110 may send a series of HTTP requests 156 to the web server 190. In response to the HTTP requests 156, the web server 190 sends a series of HTTP responses 157 to the user device 120. The web traffic data 155 may be intercepted by the web interceptor 150 of system 100. The HTTP requests 156 and the HTTP responses 157 include data elements 178, such as for example, invoices, purchase orders, and shipping documents, that are transmitted between the users 110 and the web server 190. The web traffic data 155 including the HTTP requests 156 and the HTTP responses 157 may be further processed by the system 100 to extract the data elements 178.

At step 706, the system 100 de-duplicates the web traffic data 155 into multiple clusters 176 of data elements 178. For example, system 100 may extract the data elements 178 from the web traffic data 155 and remove the duplicate copies of the data elements 178. System 100 may further segregate the data elements 178 into a plurality of clusters 176 using a k-means clustering technique. Each cluster 176 of data elements 178 is associated with a pre-defined data type 145. For example, a first cluster 176 may include a plurality of data elements 178 comprising invoices associated with the users 110. A second cluster 176 may include a plurality of data elements 178 comprising purchase orders associated with the users 110. A third cluster 176 may include a plurality of data elements 178 comprising shipping documents associated with the users 110.

De-duplication reduces the amount of data that must be stored in the system 100. This facilitates reducing the burden on the memory space of the computers that implement the system 100 and freeing up the memory space for other operations, thereby improving the performance of the computers and the overall system 100. Furthermore, this approach reduces the amount of data that must be transmitted over the network 130, thereby reducing the strain on the network 130 and alleviating the network bottlenecks.

At step 708, the system 100 identifies a first cluster 176 associated with a first pre-defined data type 145. For example, the system 100 may identify a first cluster 176 including data elements 178 comprising invoices.

At step 710, the system 100 identifies data elements 178 in the first cluster 176 that are associated with a first user 110. The system 100 may inspect the data elements 178 in the first cluster 176 and identify a subset of the data elements 178 that are associated with the first user 110. These data elements 178 were previously extracted from the web traffic data 155 which means that they have been sent to the first user 110. The system 100 will then determine whether these data elements 178 include any data that is not supposed to be sent to the first user 110.

At step 712, the system 100 identifies a first allow table 142 associated with the first pre-defined data type 145. For example, the system 100 may identify an allow table 142 that is associated with the data type 145 of invoice.

At step 714, the system 100 identifies allowed data elements 146 in the first allow table 142 that are associated with the first user 110. For example, the system 100 may identify a subset of the allowed data elements 146 in the allow table 142 that are indicated to be relevant to the first user 110.

At step 716, the system 100 compares the identified data elements 178 as determined at step 710 to the identified allowed data elements 146 as determined at step 714.

At step 718, the system 100 determines whether the identified data elements 178 in the first cluster 176 comprises at least one data element 178 that is not in the identified allowed data elements 146 in the first allow table 142. If the system 100 determines that the identified data elements 178 in the first cluster 176 comprises at least one data element 178 that is not in the identified allowed data elements 146 in the first allow table 142, method 700 proceeds to step 720.

At step 720, the system 100 determines that a data leakage error 186 is detected in response to determining that the identified data elements 178 in the first cluster 176 comprises at least one data element 178 that is not in the identified allowed data elements 146 in the first allow table 142.

At step 722, the system 100 generates an alarm indicating that a data leakage error 186 is detected.

Web Incident Replay

Web session recording and playback tools help enterprises to analyze the sequence of activities performed by customers on their web applications. Such tools help application support teams replay production incidents and review the UI responses as viewed by customers. Having such tools eliminates the embarrassment of support personal going back to customers requesting more information on steps that led to issues. Analysis of the data collected by such tools helps enterprises in multiple areas, such as for example, customer behavior monitoring, identifying data leaks, and intrusion detections.

Currently few tools are available to record and replay user's web sessions. However, the existing tools have many limitations, for example such as, (1) both static and dynamic contents are saved together, which requires high storage space; (2) inseparable dynamic data (from static data) contents makes data analytics complex; (3) no graphical visual summary of UI flow, which makes problem analysis harder; and (4) some existing tools require additional hardware to capture data which makes implementation costly.

In the present disclosure, the system 100 further includes many components for intercepting and reconstructing session data for web incidents such that the dynamic contents are demarcated from the static contents. Referring back to FIG. 1, system 100 further includes a playback request interceptor 191, a sequence builder engine 192, and a playback engine 193.

In general, system 100 uses the sequence builder engine 192 to generate user session objects 802 based on web traffic data 155, receives a playback request 102 to replay a user session object 802 that includes a web incident, and uses the playback engine 193 to playback the user session object 802.

The operations of these components will be discussed below in greater detail with reference to FIGS. 9-11.

Playback request interceptor 191 is a special purpose computer configured to intercept all incoming playback requests 102. The playback request interceptor 191 may be further configured to distinguish the playback requests 101 from other user requests, for example such as the HTTP requests 156.

Figure 8:
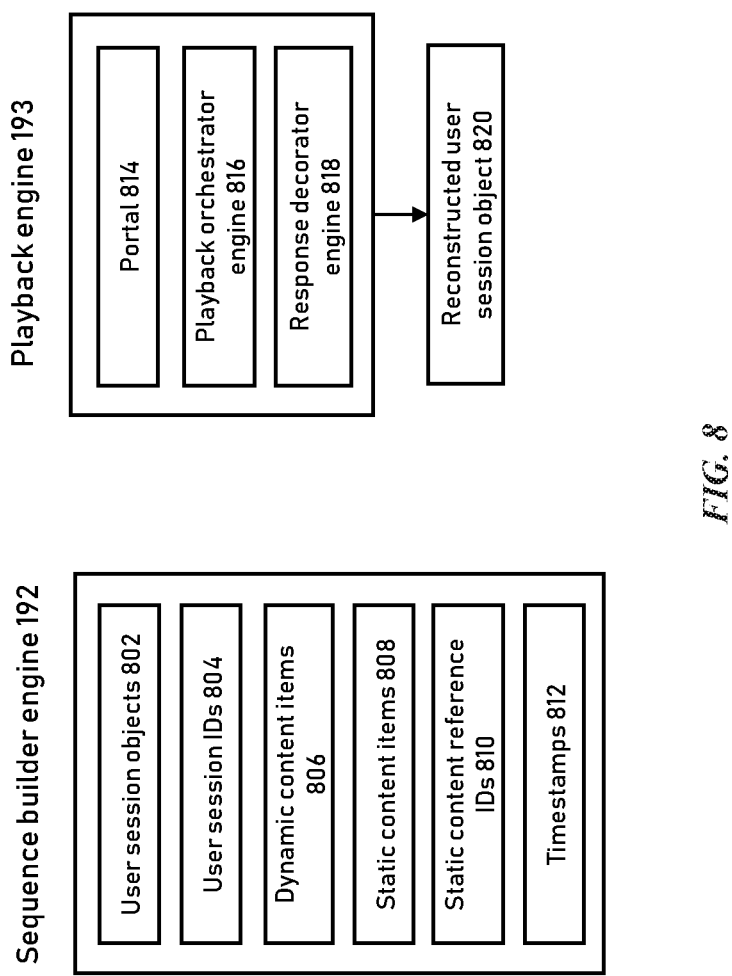
FIG. 8 illustrates exemplary embodiments of a sequence builder engine and a playback engine, according to the present disclosure.

Referring to FIG. 8, sequence builder engine 192 is a special purpose computer configured to generate user session objects 802. A user session object 802 is a data structure that is specifically constructed to represent user activities within a user session. For example, a user session object 802 may be a graphical summary of actions performed by a user 110 during a web session. In some embodiments, a user session object 802 comprises a Directed Acyclic Graph (DAG) object including multiple vertex objects that are linked together in sequence, wherein each of the vertex objects represents a web activity during a web session associated with the user 110. Each of the user session objects 802 is associated with a user session ID 804 and includes multiple dynamics content items 806 that are linked together in sequence based on their associated timestamps 812. Each of the dynamics content items 806 may include one or more static content reference IDs 810 associated with one or more static content items 808.

Figure 9:
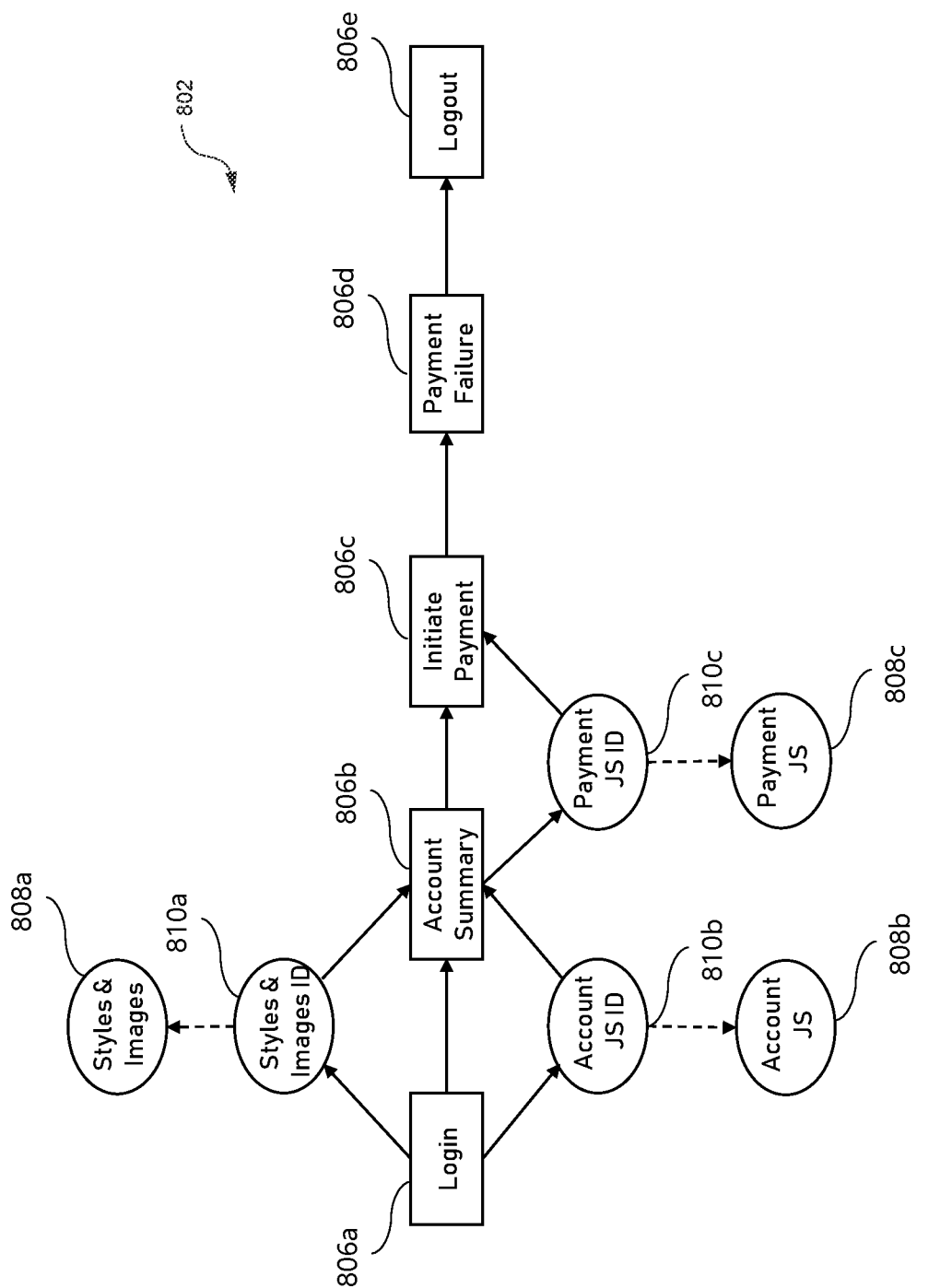
FIG. 9 illustrates an exemplary embodiment of a user session object, according to the present disclosure.

FIG. 9 illustrates an exemplary embodiment of a user session object 802. As illustrated, the user session object 802 comprises multiple dynamic content items 806*a-e* and multiple static content reference IDs 810*a-c*. Each of the static content reference IDs 810*a-c* is associated with a static content item 808 and is included in a corresponding dynamic content item 806. Each of the dynamic content items 806*a-e* may include a dynamic web page. Each of the static content items 808 may include a JavaScript (JS) element, a cascading style sheet (CSS) element, or an image. Each of the static content reference IDs 810 may include a web address associated with a corresponding static content item 808. For example, in FIG. 9, the user session object 802 includes five dynamic content items 806*a-e* including "login," "account summary," "initiate payment," "payment failure," and "logout," and three static content item reference IDs 810*a-c* including "styles&images ID," "account JavaScript (JS) ID," and "payment JS ID." The static content item IDs 810*a* and 810*b* are associated with static content items 808*a* and 808*b* and are included within the dynamic content item 806*b*, and the static content item ID 810*c* is associated with the static content item 808*c* and is included within the dynamic content item 806*c*. The generation of the user session object 802 will be discussed below in greater detail with reference to FIG. 10.

Figure 10:
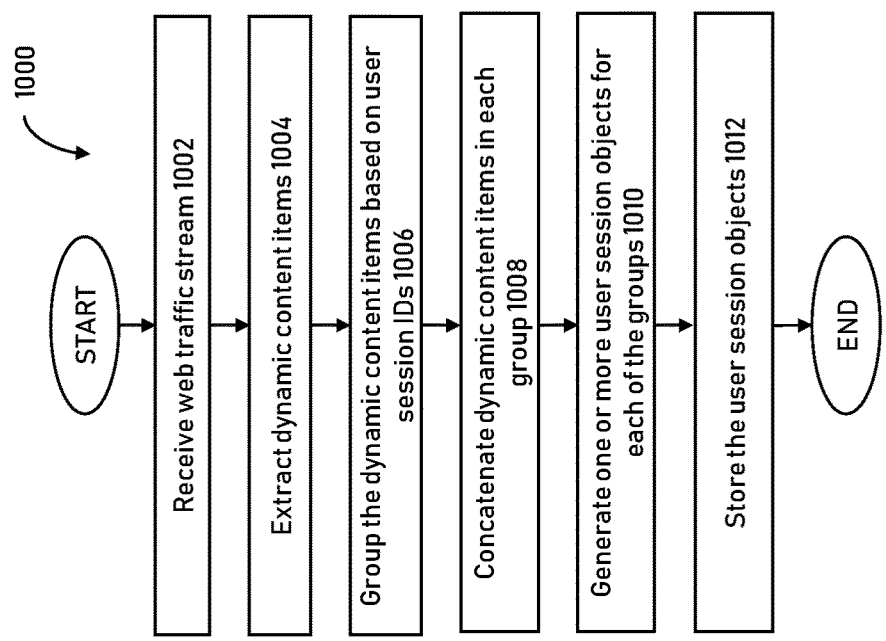
FIG. 10 illustrates an exemplary embodiment of a method of generating a user session object, according to the present disclosure.

FIG. 10 illustrates an exemplary embodiment of a method 1000 of generating user session objects 802, according to the present disclosure. The following is a non-limiting example that illustrates how the sequence builder engine 192 of the system 100 implements method 1000.

Upon starting the process, the system 100 receives web traffic data 155 (step 1002). In general, the web traffic data 155 comprise HTTP requests 156 and HTTP responses 157. In some embodiments, the web traffic data 155 further comprises dynamic content items 806 and static content items 808. Each of the dynamic content items 806 is associated with a user session ID 804 and a timestamp 812. Each of the dynamic content items 806 may also include one or more static content reference IDs 810 associated with one or more static content items 808. For example, each of the dynamic content items 806 may include a dynamic web page that displays different content each time it's viewed. A dynamic web page may be a server-side dynamic web page whose construction is controlled by an application server processing server-side scripts or a client-side web page that is processed using HTML scripting running in a web browser as it loads. A dynamic content items 806 may be loaded by the system 100 to change some variable content within different user sessions. Different users 110 of the system 100 may view different web elements (e.g., HTML elements) of a dynamic content item 806 based on the preference or attributes of the users 110. Or a user 110 may view different web elements of a dynamic content item 806 within different user sessions. On the other hand, static content items 808 generally include web content that can be delivered to users 110 without having to be modified or processed. For example, a static content item 808 may include a JS element, a CSS element, or an image that is stored in data stores over the network 130. In some embodiments, the static content items 808 are stored in the web server 190.

At step 1004, the sequence builder engine 192 extracts the dynamic content items 806 from the web traffic data 155. For example, the sequence builder engine 192 may process the web traffic data 155 such that the dynamic content items 806 are separated from the static content items 808. The dynamic content items 806 extracted from the web traffic data 155 may include dynamic content items 806 that are associated with different user session IDs 804.

At step 1006, the sequence builder engine 192 proceeds to group the dynamic content items 806 based on their associated user session IDs 804. For example, the sequence builder engine 192 may divide the dynamic content items 806 into multiple groups, wherein each of the groups includes dynamic content items 806 associated with a same user session ID 804. Therefore, each group of dynamic content items 806 include a series of activities performed by a user 110 during a limited period of time (e.g., a user session having a user session ID 804). For example, a group of the dynamic content items 806 may include a series of web pages that have been requested by a user and loaded by the system 100 during a visit of the user 110 to a web site.

At step 1008, the sequence builder engine 192 concatenates the dynamic content items 806 in each of the groups as previously determined at step 1006. For example, the sequence builder engine 192 may link the dynamic content items 806 in a group in sequence based on their timestamps 812. Referring to FIG. 9, the dynamic content items 806*a-e* are associated with a same user session ID 804 and each of them is associated with a timestamp 812. The dynamic content items 806*a-e* are linked together in sequence based on their timestamps 812 such that the dynamic content item 806*a* has the earliest timestamp 812 and the dynamic content item 806*e* has the latest timestamp 812.

Referring back to FIG. 10, at step 1010, the sequence builder engine 192 generates one or more user session objects 802. For example, the sequence builder engine 192 may generate a user session object 802 for each of the groups of dynamic content items 806. Each user session object 802 includes a series of dynamic content items 806 linked together based on their timestamps 812. In some embodiments where the user session objects 802 are DAG objects, the user session objects 802 provide a graphical summary of actions performed by users 110 during a user session.

At step 1012, the sequence builder engine 192 stores the user session objects 802. Note that a user session object 802 only includes the dynamic content items 806 but not the static content items 808. And because the dynamic content items 806 include the static content reference IDs 810, the sequence builder engine 192 only stores the dynamic content items 806 that include references to the dynamic content items 808. A static content reference ID 810 is significantly smaller in size than a corresponding static content item 808. Storing only the static reference IDs 810 instead of the static content items 808 in the user session objects 802 reduces the memory for storing the user session objects 802. This significantly reduces a burden on the memory space of the computers that implement the disclosed system 100, thereby improving the performance of the computers and the overall system 100.

System 100 further includes a playback engine 193 specifically configured to replay the user session objects 802. Referring back to FIG. 8, in some embodiments as illustrated, the playback engine 193 includes a portal 814, a playback orchestrator engine 816, and a response decorator engine 818.

Portal 814 may include a user interface that is specifically configured with security assertion markup language (SAML) authentication techniques to allow authenticated user 110 to search across various user sessions using different query criteria (e.g., user, data and time). When a user 110 chooses to playback a user session object 802 representing a user session, the user session object 802 may be fetched and played using playback orchestrator engine 816.

Playback orchestrator engine 816 is a special purpose computer configured to reconstruct user sessions by aggregating dynamic content items 806 and static content items 808. The playback orchestrator engine 816 may use a user session object 802 to identify sequence of the dynamic content items 806 and other resources for session reconstruction. For example, the playback orchestrator engine 816 may identify the sequence of multiple dynamic web pages represented by the dynamic content items 806 in a user session object 802. The playback orchestrator engine 816 may also identify one or more web addresses that are represented by the static content reference IDs 810 in the dynamic content items 806. Then, the playback orchestrator engine 816 may use the static content reference IDs 810 to look for the associated static contents items 808, such as for example JS elements, CSS styles, or images. The playback orchestrator engine 816 may further associate the static contents items 808 with corresponding dynamic content items 806. The static content items 808 and the dynamic content items 806 may then be used to reconstruct a user session. The reconstruction of a user session from a user session object 802 will be discussed below in greater detail with reference to FIG. 11.

Response decorator engine 818 is a special purpose computer configured to render the dynamic content items 806 and the static content items 808 that are reconstructed from a user session object 802. For example, the response decorator engine 818 may render the dynamic content items 806 and the static content items 808 such that they are in the same format as what a user 110 previously viewed in an old user session.

Figure 11:
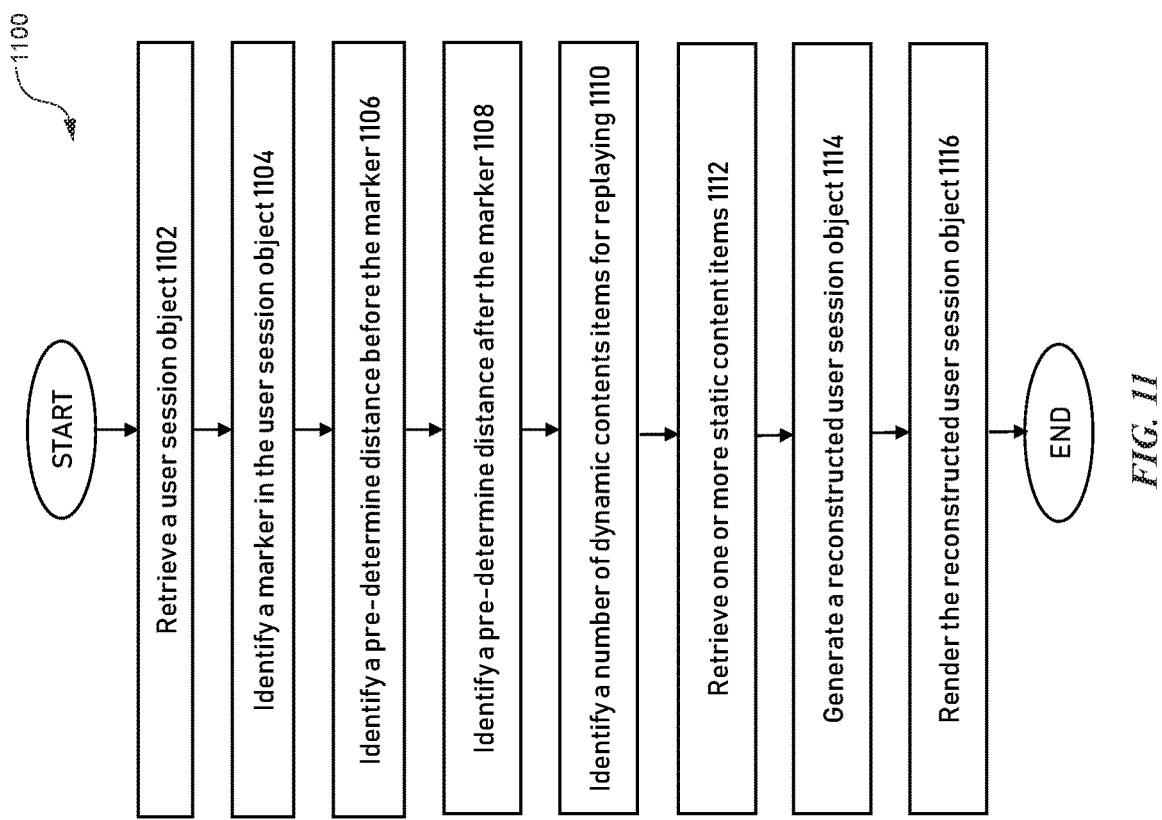
FIG. 11 illustrates an exemplary embodiment of a method of replaying a user session object, according to the present disclosure.

FIG. 11 illustrates an exemplary embodiment of a method 1100 of replaying user session objects 802, according to the present disclosure. The following is a non-limiting example that illustrates how the playback engine 193 of the system 100 implements method 1100.

Before starting the process, the system 100 may receive a request 102 to replay a user session object 802 that includes a web incident. For example, the playback request interceptor 191 may receive a request 102 to replay a user session object 802 that includes a marker 806. A marker 806 in a user session object 802 is generally a dynamic content item 806 that indicates an exception in a user session. For example, referring to FIG. 9, the dynamic content item 806*d* is a marker 806 that indicates a payment failure during a user session. By replaying the user session object 802 that includes a marker 806, a support personal may be able to find out a cause to the exception during a user session.

The process starts at step 1102 where the playback engine 193 retrieves a user session object 802 that is requested for replay. The user session object 802 may have a marker 806 comprising a dynamic content item 806 that indicates an exception/anomaly in the user session object 802.

At step 1104, the playback engine 193 identifies the marker 806 in the user session object 802. For example, the playback orchestrator engine 816 of the playback engine 193 may use the user session object 802 to identify sequence of the dynamic content items 806 and a position of the marker 806 in the user session object 802. In some embodiments, the playback engine 193 may replay only a portion of the user session object 802 that includes the marker 806. For example, the playback orchestrator engine 816 may identify a subset of the linked dynamic content items 806 in the user session object 802 that includes the marker 806. If a user session object 802 is large in size, replaying the whole user session object 802 may take significantly long time. Therefore, replaying only a portion of the user session object 802 will reduce the processing time of the system 100 on reconstructing the user sessions. This approach also conserves the computing resources and memory that are expended on reconstructing the user sessions because replaying a portion of the user session object 802 requires less computing resources and memory than replaying the whole user session object 802.

At step 1106, the playback orchestrator engine 816 identifies a pre-determined distance before the marker 806. For example, the playback orchestrator engine 816 may identify a pre-determined number (e.g., 3, 5) of dynamic content items 806 in sequence before the marker 806 based on their timestamps 812. In some embodiments, the pre-determined number of dynamic content items 806 in sequence before the marker 806 is specified by a user 110.

At step 1108, the playback orchestrator engine 816 identifies a pre-determined distance after the marker 806. For example, the playback orchestrator engine 816 may identify a pre-determined number (e.g., 3, 5) of dynamic content items 806 in sequence after the marker 806 based on their timestamps 812. Note that the pre-determined number of dynamic content items 806 in sequence after the marker 806 are not necessarily equal to the pre-determined number of dynamic content items 806 in sequence before the marker 806 as identified at step 1106.

At step 1110, the playback orchestrator engine 816 determines a number of dynamics content items 806 for replaying. For example, the playback orchestrator engine 816 may combine the pre-determined number of dynamic content items 806 in sequence before the marker 806 as determined at step 1106 with the pre-determined number of dynamic content items 806 in sequence before the marker 806 as determined at step 1108. As such, the number of dynamics content items 806 as determined for replaying include a portion of the user session object 802.

At step 1112, the playback orchestrator engine 816 retrieves one or more static content items 808 that are associated with the dynamics content items 806 as determined at step 1110. As noted before, a dynamic content item 806 may include one or more static content reference IDs 810. To retrieve the static content items 808, the playback orchestrator engine 816 may identify the static content reference IDs 810 in the dynamics content items 806. Then, the playback orchestrator engine 816 uses the static content reference IDs 810 to retrieve the associated static content items 808. For example, in the embodiments where static content reference IDs 810 comprise web addresses for the static content items 808, the playback orchestrator engine 816 may retrieve the static content items 808 using the web addresses. After retrieving the static content items 808, the playback orchestrator engine 816 may further associate the static content items 808 with the dynamic content items 806 based on the static content reference IDs 810.

At step 1114, the playback orchestrator engine 816 generates a reconstructed user session object 820. The reconstructed user session object 820 includes the dynamics content items 806 as determined at step 1110 and the static content items 808 as determined at step 1112. For example, the reconstructed user session object 820 may include a series of dynamic web pages and multiple static contents, for example such as JS elements, CSS elements, or images associated with the dynamic web pages. The reconstructed user session object 820 may be used to reconstruct a user session by rendering the dynamic web pages with the static contents.

At step 1116, the playback engine 193 renders the reconstructed user session object 820. For example, the response decorator engine 818 of the playback engine 193 may render the dynamic content items 806 and the static content items 808 such that they are in the same format as what a user 110 previously viewed in an old user session.

The system 100 and the approach for generating and replaying the user session objects 802 as disclosed in the present disclosure have many technological advantages. For example, the dynamic content items 806 are demarcated from the static contents items 808 and only the dynamic content items 806 are stored in the user session objects 802. Eliminating static contents in data storage reduces memory for storing the user session objects 802 and increases efficiency for downstream data analytics applications. Furthermore, the user session objects 802 are representations of UI flow which helps visually represent a graphical summary of user activities and makes problem analysis quicker.

An engine described in the present disclosure, such as data streaming engine 160, clustering engine 170, leakage detection engine 180, sequence builder engine 192, and playback engine 173, may include hardware, software, or other engine(s). An engine may execute any suitable operating system such as, for example, IBM's zSeries/Operating System (z/OS), MS-DOS, PC-DOS, MAC-OS, WINDOWS, a .NET environment, UNIX, OpenVMS, or any other appropriate operating system, including future operating systems. The functions of an engine may be performed by any suitable combination of one or more engines or other elements at one or more locations.

A processor described in the present disclosure may comprise any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs). The processor may be a programmable logic device, a microcontroller, a microprocessor, or any suitable combination of the preceding. The processor may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

A memory described in the present disclosure, may comprise any device operable to store, either permanently or temporarily, data, operational software, or other information for a processor. In some embodiments, the memory comprises one or more disks, tape drives, or solid-state drives, and may be used as an over-flow data storage device, to store programs when such programs are selected for execution, and to store instructions and data that are read during program execution. The memory may comprise any one or a combination of volatile or non-volatile local or remote devices suitable for storing information. For example, the memory may comprise random access memory (RAM), read only memory (ROM), magnetic storage devices, optical storage devices, semiconductor storage devices, or any other suitable information storage device or a combination of these devices.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skill in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

What is claimed is:

1. A system for generating a user session object, comprising:
   a memory;
   one or more processors;
   a sequence builder engine implemented by the one or more processors and configured to:
      receive a web traffic data stream, the web traffic data stream comprising a plurality of dynamic content items and a plurality of static content items, each of the dynamic content items being associated with a user session ID, each of the dynamic content items comprising one or more static content reference IDs associated with one or more of the static content items, each of the dynamic content items being associated with a timestamp;
      extract the plurality of the dynamic content items from the web traffic data stream such that the dynamic content items are separated from the static content items;
      group the plurality of dynamic content items into a number of groups based on the user session IDs associated with the dynamic content items, each group being associated with a user session ID;
      identify a first group of dynamic content items that are associated with a first user session ID;
      concatenate the first group of dynamic content items based on the timestamps associated with the first group of dynamic content items;
      generate a first user session object for the first group of dynamic content items, the first user session object comprising the concatenated first group of dynamic content items; and
      store the first user session object in the memory.

2. The system of claim 1, wherein the first user session object further comprises a marker, the marker comprising a dynamic content item identifying an exception, wherein the system further comprises a playback engine, the playback engine implemented by the one or more processors and configured to:
   identify the marker in the first user session object;
   identify, from the first user session object, a first predetermined number of dynamic content items before the marker based on their timestamps;
   identify, from the first user session object, a second predetermined number of dynamic content items after the flagging item based on their timestamps; and
   determine a subset of the first user session object, the subset of the first user session object comprising the first predetermined number of dynamic content items and the second first predetermined number of dynamic content items.

3. The system of claim 2, wherein the playback engine is further configured to:
   identify a number of dynamic content items in the subset of the first user session object;
   identify one or more static content reference IDs in the identified dynamic content items, the one or more static content reference IDs being associated with one or more static content items;
   retrieve the one or more static content items based on the one or more static content reference IDs;
   generate a reconstructed user session object, the reconstructed user session object comprising the identified dynamic content items and the retrieved one or more static content items; and
   render the reconstructed user session object.

4. The system of claim 3, wherein generating the reconstructed user session object comprising associating the retrieved one or more static content items with the identified dynamic content items.

5. The system of claim 1, wherein each of the static content items comprises:
   a JavaScript (JS) element;
   a cascading style sheet (CSS) element; or
   an image.

6. The system of claim 1, wherein each of the dynamic content items comprises a dynamic web page.

7. The system of claim 1, wherein each of the static content reference IDs comprises a web address associated with a static content item.

8. The system of claim 1, wherein the web traffic data stream comprises HTTP requests and HTTP responses.

9. The system of claim 1, wherein the first user session object comprises a directed acyclic graph (DAG) object.

10. A non-transitory computer-readable medium comprising a logic for generating a user session object, the logic, when executed by one or more processors, instructing the one or more processors to:
receive a web traffic data stream, the web traffic data stream comprising a plurality of dynamic content items and a plurality of static content items, each of the dynamic content items being associated with a user session ID, each of the dynamic content items comprising one or more static content reference IDs associated with one or more of the static content items, each of the dynamic content items being associated with a timestamp;
extract the plurality of the dynamic content items from the web traffic data stream such that the dynamic content items are separated from the static content items;
group the plurality of dynamic content items into a number of groups based on the user session IDs associated with the dynamic content items, each group being associated with a user session ID;
identify a first group of dynamic content items that are associated with a first user session ID;
concatenate the first group of dynamic content items based on the timestamps associated with the first group of dynamic content items;
generate a first user session object for the first group of dynamic content items, the first user session object comprising the concatenated first group of dynamic content items; and
store the first user session object.

11. The non-transitory computer-readable medium of claim 10, wherein the first user session object further comprises a marker, the marker comprising a dynamic content item identifying an exception, wherein the logic further instructs the one or more processors to:
identify the marker in the first user session object;
identify, from the first user session object, a first predetermined number of dynamic content items before the marker based on their timestamps;
identify, from the first user session object, a second predetermined number of dynamic content items after the flagging item based on their timestamps; and
determine a subset of the first user session object, the subset of the first user session object comprising the first predetermined number of dynamic content items and the second first predetermined number of dynamic content items.

12. The non-transitory computer-readable medium of claim 11, wherein the logic further instructs the one or more processors to:
identify a number of dynamic content items in the subset of the first user session object;
identify one or more static content reference IDs in the identified dynamic content items, the one or more static content reference IDs being associated with one or more static content items;
retrieve the one or more static content items based on the one or more static content reference IDs;
generate a reconstructed user session object, the reconstructed user session object comprising the identified dynamic content items and the retrieved one or more static content items; and
render the reconstructed user session object.

13. The non-transitory computer-readable medium of claim 12, wherein generating the reconstructed user session object comprising associating the retrieved one or more static content items with the identified dynamic content items.

14. The non-transitory computer-readable medium of claim 10, wherein each of the static content items comprises:
a JavaScript (JS) element;
a cascading style sheet (CSS) element; or
an image.

15. The non-transitory computer-readable medium of claim 10, wherein the first user session object comprises a directed acyclic graph (DAG) object.

16. A method for generating a user session object, comprising:
receiving a web traffic data stream, the web traffic data stream comprising a plurality of dynamic content items and a plurality of static content items, each of the dynamic content items being associated with a user session ID, each of the dynamic content items comprising one or more static content reference IDs associated with one or more of the static content items, each of the dynamic content items being associated with a timestamp;
extracting the plurality of the dynamic content items from the web traffic data stream such that the dynamic content items are separated from the static content items;
grouping the plurality of dynamic content items into a number of groups based on the user session IDs associated with the dynamic content items, each group being associated with a user session ID;
identifying a first group of dynamic content items that are associated with a first user session ID;
concatenating the first group of dynamic content items based on the timestamps associated with the first group of dynamic content items;
generating a first user session object for the first group of dynamic content items, the first user session object comprising the concatenated first group of dynamic content items; and
storing the first user session object.

17. The method of claim 16, wherein the first user session object further comprises a marker, the marker comprising a dynamic content item identifying an exception, wherein the method further comprises:
identifying the marker in the first user session object;
identifying, from the first user session object, a first predetermined number of dynamic content items before the marker based on their timestamps;
identifying, from the first user session object, a second predetermined number of dynamic content items after the flagging item based on their timestamps; and
determining a subset of the first user session object, the subset of the first user session object comprising the first predetermined number of dynamic content items and the second first predetermined number of dynamic content items.

18. The method of claim 17, wherein the method further comprises:
identifying a number of dynamic content items in the subset of the first user session object;
identifying one or more static content reference IDs in the identified dynamic content items, the one or more static content reference IDs being associated with one or more static content items;
retrieving the one or more static content items based on the one or more static content reference IDs;

generating a reconstructed user session object, the reconstructed user session object comprising the identified dynamic content items and the retrieved one or more static content items; and rendering the reconstructed user session object.

19. The method of claim 18, wherein generating the reconstructed user session object comprising associating the retrieved one or more static content items with the identified dynamic content items.

20. The method of claim 16, wherein the first user session object comprises a directed acyclic graph (DAG) object.

* * * * *